US007720868B2

(12) United States Patent
Mauceri, Jr. et al.

(10) Patent No.: US 7,720,868 B2
(45) Date of Patent: May 18, 2010

(54) PROVIDING ASSISTANCE WITH THE CREATION OF AN XPATH EXPRESSION

(75) Inventors: Robert J. Mauceri, Jr., Seattle, WA (US); Charles W. Parker, Sammamish, WA (US); Zhenguang Chen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 216 days.

(21) Appl. No.: 11/598,455

(22) Filed: Nov. 13, 2006

(65) Prior Publication Data

US 2008/0115051 A1 May 15, 2008

(51) Int. Cl.
G06F 17/30 (2006.01)
(52) U.S. Cl. .................. 707/796; 707/797
(58) Field of Classification Search .......... 707/101, 707/102
See application file for complete search history.

(56) References Cited

U.S. PATENT DOCUMENTS

| 5,121,477 | A | 6/1992 | Koopmans et al. |
| 5,390,281 | A | 2/1995 | Luciw et al. |
| 5,754,737 | A | 5/1998 | Gipson |
| 5,761,689 | A | 6/1998 | Rayson et al. |
| 6,021,403 | A | 2/2000 | Horvitz et al. |
| 6,373,502 | B1 | 4/2002 | Nielsen |
| 6,377,965 | B1 | 4/2002 | Hachamovitch et al. |
| 6,564,213 | B1* | 5/2003 | Ortega et al. ............ 707/5 |
| 6,886,016 | B2* | 4/2005 | Hansen et al. .......... 707/102 |
| 7,062,507 | B2* | 6/2006 | Wang et al. ............. 707/102 |
| 7,062,711 | B2 | 6/2006 | Kethireddy |
| 2004/0122844 | A1* | 6/2004 | Malloy et al. .......... 707/102 |
| 2004/0181543 | A1* | 9/2004 | Wu et al. ............... 707/102 |
| 2004/0205585 | A1* | 10/2004 | McConnell ............ 715/513 |

(Continued)

OTHER PUBLICATIONS

Hyvonen et al., "Semantic Autocompletion", http://www.seco.tkk.fi/publications/2006/hyvonen-makela-semantic-autocompletion-2006.pdf#search=%22%22Semantic%20Autocompletion%22%22.

(Continued)

Primary Examiner—Don Wong
Assistant Examiner—Kim T Nguyen

(57) ABSTRACT

Methods and computer-readable media are provided for assisting with the creation of an extensible markup language ("XML") path language ("XPath") expression. According to one aspect, an application program for editing XSLT stylesheets provides a user interface that assists with the creation and editing of XPath expressions. When an XPath expression is being created, a user interface is displayed that includes the valid XPath tokens for the expression being created. As characters are entered into the expression, the valid XPath tokens are continually identified for the expression and the contents of the user interface control are updated. If one of the items displayed in the user interface control is selected, the XPath token corresponding to the selected item is inserted into the XPath expression.

20 Claims, 9 Drawing Sheets

U.S. PATENT DOCUMENTS

| | | | |
|---|---|---|---|
| 2005/0004973 A1 | 1/2005 | Snover et al. | |
| 2005/0091258 A1* | 4/2005 | Snover et al. | 707/102 |
| 2005/0138063 A1* | 6/2005 | Bazot et al. | 707/102 |
| 2005/0149552 A1* | 7/2005 | Chan et al. | 707/102 |
| 2005/0160110 A1* | 7/2005 | Charlet et al. | 707/102 |
| 2005/0228818 A1* | 10/2005 | Murthy et al. | 707/102 |
| 2006/0004814 A1* | 1/2006 | Lawrence et al. | 707/101 |
| 2006/0036642 A1* | 2/2006 | Horvitz et al. | 707/102 |
| 2006/0130015 A1 | 6/2006 | Griffin | |
| 2006/0184925 A1 | 8/2006 | Ficatier et al. | |
| 2006/0235868 A1* | 10/2006 | Achilles et al. | 707/102 |
| 2006/0242563 A1* | 10/2006 | Liu et al. | 715/513 |
| 2007/0208723 A1* | 9/2007 | Peterson et al. | 707/4 |
| 2007/0208769 A1* | 9/2007 | Boehm et al. | 707/102 |
| 2008/0065617 A1* | 3/2008 | Burke et al. | 707/5 |
| 2009/0119289 A1* | 5/2009 | Gibbs et al. | 707/5 |
| 2009/0132529 A1* | 5/2009 | Gibbs | 707/5 |

OTHER PUBLICATIONS

Jakobsson, M., "Autocompletion in Full Text Transaction Entry: A Method for Humanized Input", Date: 1986, pp. 327-332, ACM Press, New York, US, http://delivery.acm.org/10.1145/30000/22391/p327-jakobsson.pdf?.

Torok, CS, "Visualization and data analysis in the MS .NET framework", Date: 2004, http://www.jinr.ru/publish/Preprints/2004/136(e10-2004-136).pdf.

Vidiera et al., "The ProjectIT-RSL Language Overview", Date: 2004, http://berlin.inesc-id.pt/alb/static/papers/2004/cv-umI2004.pdf.

* cited by examiner

```xml
<?xml version ='1.0'?>
<BREAKFAST-MENU>
    <FOOD type="waffle">
        <NAME>Belgian Waffles</NAME>
        <PRICE>$6.50</PRICE>
        <DESCRIPTION>Two Belgian Waffles with syrup</DESCRIPTION>
        <CALORIES>650</CALORIES>
    </FOOD>
    <FOOD>
        <NAME>Strawberry Belgian Waffles</NAME>
        <PRICE>$7.95</PRICE>
        <DESCRIPTION>Belgian Waffles with strawberries</DESCRIPTION>
        <CALORIES>900</CALORIES>
    </FOOD>
    <FOOD>
        <NAME>Berry-Berry Belgian Waffles</NAME>
        <PRICE>$8.95</PRICE>
        <DESCRIPTION>Belgian Waffles with fresh berries</DESCRIPTION>
        <CALORIES>900</CALORIES>
    </FOOD>
    <FOOD type = "toast">
        <NAME>French Toast</NAME>
        <PRICE>$6.50</PRICE>
        <DESCRIPTION>Thick slices of french toast with butter</DESCRIPTION>
        <CALORIES>600</CALORIES>
    </FOOD>
    <FOOD type="egg">
        <NAME>Homestyle Breakfast</NAME>
        <PRICE>$6.95</PRICE>
        <DESCRIPTION>Two eggs with back and toast</DESCRIPTION>
        <CALORIES>950</CALORIES>
    </FOOD>
</BREAKFAST>
```

PROVIDING ASSISTANCE WITH THE CREATION OF AN XPATH EXPRESSION

BACKGROUND

Extensible Stylesheet Language Transformations ("XSLT") is an Extensible Markup Language ("XML")-based language used for the transformation of XML documents. XSLT is processed by an XSLT processor that takes two input files: an XML source document and an XSLT stylesheet file containing the XSLT program text. The XSLT processor reads the XSLT stylesheet file and the XML source document and, based upon the XSLT program text, retrieves portions of the XML source document, transforms them, and sends them to an output file. The output file may be XML, hyper-text markup language ("HTML"), plain text, or any other format that the XSLT processor is capable of producing.

In order to identify subsets of the source document, certain XSLT tags include attributes that are specified using the XML Path Language ("XPath"). XPath is a query language for addressing portions of an XML document. This allows consumers of XML to query the XML source document and directly access any part of the XML contained therein. XPath expressions can address a single word or character within an XML source document, or can refer to entire sections of the XML source document at once.

XPath derives its name from its use of a path notation for navigating through the hierarchical structure of an XML source document. In addition to providing functionality for addressing parts of an XML document, XPath also provides basic facilities for manipulation of strings, numbers, and Booleans. XPath uses a compact, non-XML syntax to facilitate use of XPath within Uniform Resource Identifiers ("URIs") and XML attribute values. XPath operates on the abstract, logical structure of an XML document.

Due to the complexity of XPath and its syntax, XPath expressions are often very complex. As a result, it is frequently difficult to create XPath expressions that are both syntactically correct and that return the desired portion of the XML source document, especially when the XPath expressions are created manually. It is also frequently difficult to debug XPath expressions that are syntactically incorrect or that do not return the desired portion of the XML source document.

It is with respect to these considerations and others that the disclosure made herein is provided.

SUMMARY

Methods and computer-readable media are provided herein for assisting with the creation of an XPath expression. Utilizing the mechanisms provided herein, assistance may be provided to a user during the manual creation of an XPath expression. In particular, a user interface may be displayed during the manual creation of an XPath expression that allows a user to more easily define the XPath for selecting a particular portion of an XML source document. Moreover, during the manual creation of an XPath expression, valid elements and attributes in the XML source document, XPath axes, XPath operators, XSLT variables, and XSLT functions may be displayed in the user interface and selected for inclusion in the XPath expression being constructed.

According to one aspect presented herein, an application program for editing XSLT stylesheets provides a user interface that assists with the creation and editing of XPath expressions. In particular, in one implementation, the application program generates the user interface by first determining whether an XPath expression is being created. This may be performed, for instance, by monitoring the keystrokes entered by a user to determine whether the user is creating or editing an attribute in an XSLT tag whose value is permitted to contain XPath. An XPath expression may also be created when an attribute value template ("AVT") is placed into an XSLT stylesheet. An AVT allows the insertion of an XPath expression into certain XSLT tags and is generally signified by placing the desired XPath expression within curly braces ("{ }").

If the editing application determines that a user is creating an XPath expression, the application identifies the valid XPath tokens for the portion of the XPath expression that has been created. For instance, XPath tokens may include the XML elements in an XML input data source. The valid XML elements are identified based upon the current XPath expression and upon a current context in the XML input data source. The current context is the current location within the XML input data source that the XPath expression is evaluated against. XPath tokens may also include the valid XML attributes that are also identified based upon the typed portion of the XPath expression and upon the current context in the XML input data source. XPath tokens may also include the valid XSLT variables, which are also identified based on the current context in the XSLT stylesheet file where the variables are defined.

Other types of XPath tokens may also be identified for inclusion in the user interface. In particular, in one implementation, the valid XPath axes may also be determined based on the XPath expression and upon the current context in the XML input data source. XPath axes specify a direction relative to the current context in the XML input data source. The valid XPath axes may also be determined based upon the XPath expression and upon the current context in the XML input data source.

Once the valid XPath tokens have been identified, the XPath tokens are displayed in the user interface. In one implementation, a user interface control is displayed that includes selectable items corresponding to the identified XPath tokens. For instance, a drop-down menu may be displayed that includes menu items corresponding to the identified XPath tokens. The user interface control may also include selectable items corresponding to XSLT functions and XSLT variables. The user interface control may be displayed adjacent to the XPath expression being created for easy selection of the items presented therein.

If one of the items displayed in the user interface control is selected, the XPath token or other parameter corresponding to the selected item is inserted into the XPath expression being created. In this way, the user is provided with a list of the valid XPath tokens for the current XPath expression being edited. The user can then select one of the XPath tokens, which will cause the selected XPath token to be inserted into the expression.

As the user continues to type characters into the XPath expression being created, the valid XPath tokens are continually identified for the XPath expression and the contents of the user interface control are updated. In this manner, the user is presented with a list of the currently valid XPath tokens as they type the XPath expression. At any time, the user can select one of the XPath tokens or other items in the user interface control for insertion into the XPath expression. The user interface control is removed from the display when the user has finished creating the XPath expression or moves an input insertion point away from the XPath expression.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a data diagram showing the contents of an illustrative XML source document described with reference to the various user interfaces shown in FIGS. 3A-3D;

DETAILED DESCRIPTION

Figure 1:
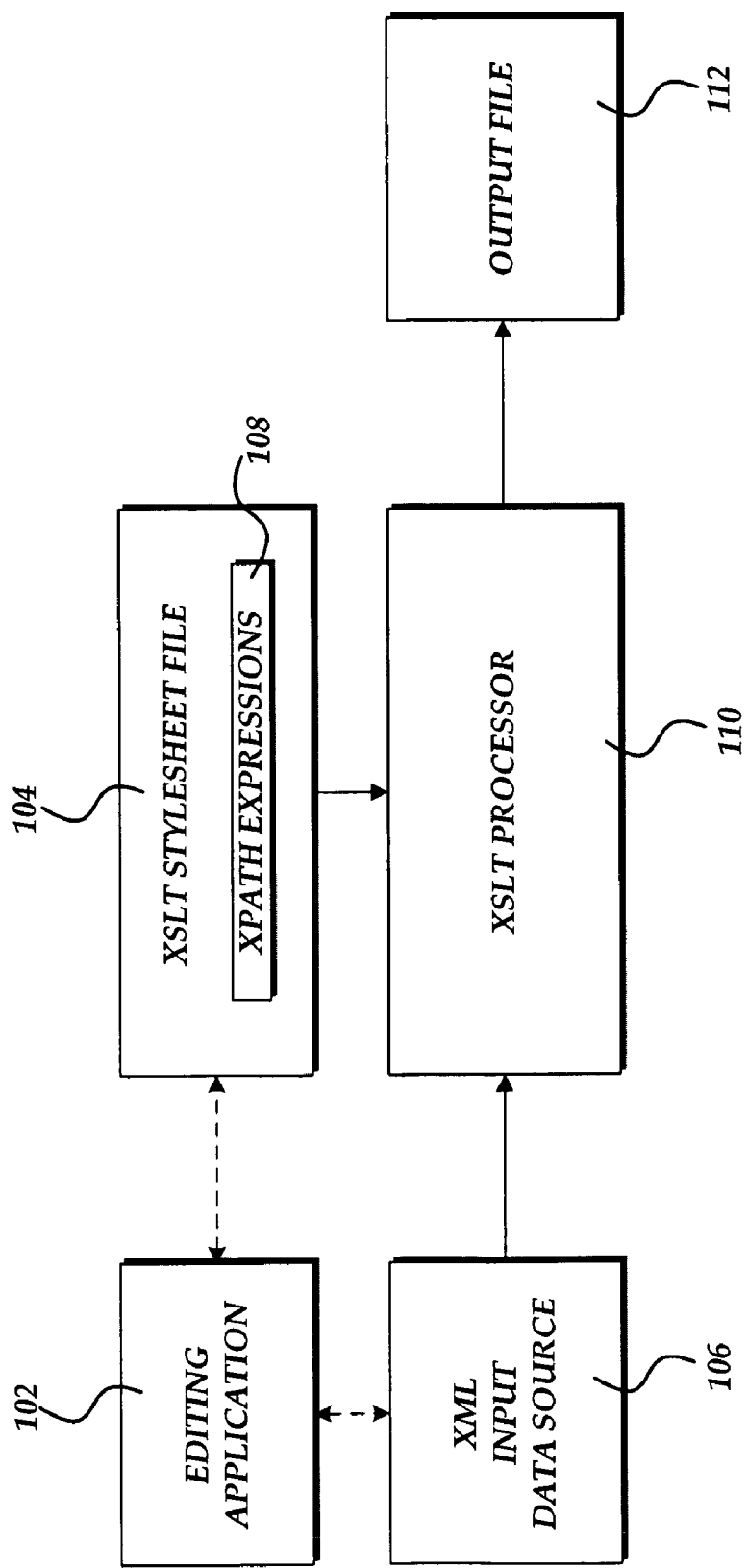
FIG. 1 is a software component diagram showing several of the software components and data files utilized by the computer systems described herein.

The following detailed description is directed to systems, methods, and computer-readable media for providing assistance with the creation of an XPath expression. As will be described in greater detail below, an editing application program is provided for editing XSLT and XPath expressions. In this regard, the editing application program can detect when an XPath expression is being created and display a user interface that provides assistance in the creation of the XPath expression. Assistance is provided in the form of selectable items corresponding to valid XPath tokens and other parameters for the expression being created. The valid XPath tokens are continually updated as a user types the XPath expression. When one of the items is selected, the XPath token corresponding to the selected item is placed into the XPath expression being edited. In this manner, a user is provided with quick and easy access to the valid XPath tokens and other valid parameters during the creation of an XPath expression. Additional details regarding this process are provided below with respect to FIGS. 1-5.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein is also described as being practiced in conjunction with a stand-alone computer system. It should be appreciated, however, that the implementations described herein may also be utilized in a distributed computing environment where tasks are performed by remote processing devices that are linked through a communications network and wherein program modules and data files may be located in both local and remote memory storage devices.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing assistance with the creation of an XPath expression will be described. In particular, FIG. 1 is a software component diagram showing several of the software components and data files utilized by the computer system described herein.

As shown in FIG. 1, an editing application 102 is provided for creating and editing an XSLT stylesheet file 104, including one or more XPath expressions 108 contained therein. As mentioned briefly above, XSLT is an XML-based language used for the transformation of XML documents. In addition to providing functionality for creating and editing an XSLT stylesheet file 104, the editing application 102 may also provide functionality for editing text files and other types of markup languages such as HTML. It should be appreciated, however, that while the embodiments presented herein are described in the context of an editing application 102 for creating and editing XSLT documents, the aspects presented herein are applicable to any type of computer program that allows the creation or editing of XPath expressions.

The XSLT stylesheet file 104 may contain one or more XPath expressions 108. For instance, in order to identify subsets of the source document, certain XSLT tags include attributes that are specified using XPath. As an example, the XSLT "<XSL:VALUE-OF>" tag includes an attribute specified using XPath for selecting a portion of an XML input data source 106. An XPath expression may also be created when an attribute value template ("AVT") is placed into an XSLT stylesheet. An AVT allows the insertion of an XPath expression inside attributes of "literal result" XSLT elements, and is generally signified by placing the desired XPath expression within curly braces ("{ }"). AVTs are not permitted inside "instructional" XSLT elements, which are the elements that are prefixed by "XSL:". The use of an XPath expression in these ways allows the XSLT stylesheet file 104 to query an XML input data source 106 and directly access any part of the XML contained therein. It should be appreciated that the XML input data source 106 may comprise a file containing XML, a remote data source such as a Really Simple Syndication ("RSS") feed that provides XML, or any other type of data source from which XML can be retrieved.

The XSLT stylesheet file 104 is processed by an XSLT processor 110 that takes two inputs: data from the XML input data source 106 and the XSLT stylesheet file 104 containing XSLT program text. The XSLT processor 110 reads the XSLT stylesheet file 104 and the XML input data source 106 and, based upon the XSLT program text, including any XPath expressions 108 contained therein, retrieves portions of the XML input data source 106, transforms the retrieved portions, and sends them to an output file 112. The output file 112 may be XML, HTML, plain text, or any other format that the XSLT processor 110 is capable of producing.

As will be described in greater detail below with reference to FIGS. 2-4, the editing application 102 also provides facilities for assisting a user with the creation of the XPath expressions 108. In particular, the editing application 102 monitors the input provided by a user to determine if the user is creating or editing an XPath expression 108. If the editing application 102 determines that the user is creating an XPath expression 108, a user interface is displayed to the user to assist with the creation and editing of the expression. Details regarding one illustrative user interface provided by the editing application 102, and methods for generating the user interface, are provided below with reference to FIGS. 2-4.

Referring now to FIGS. 2 and 3A-3D, an illustrative user interface for assisting a user with the creation of an XPath expression 108 will be described. FIGS. 3A-3D are user interface diagrams showing several aspects of a user interface for providing assistance with the creation of an XPath expression presented herein. FIG. 2 is a data diagram showing the contents of an illustrative XML input data source 106 that is utilized in the example user interfaces shown in FIGS. 3A-3D. The simple XML input data source 106 shown in FIG. 2 describes a breakfast menu and includes a "<BREAKFAST-MENU>" element having several "<FOOD>" elements. The "<FOOD>" elements include "<NAME>", "<PRICE>", "<DESCRIPTION>", and "<CALORIES>" elements. It should be appreciated that simple XML structure utilized in the XML input data source 106 is for illustration only and that the embodiments presented herein may be utilized with XML of any complexity.

Figure 3A:
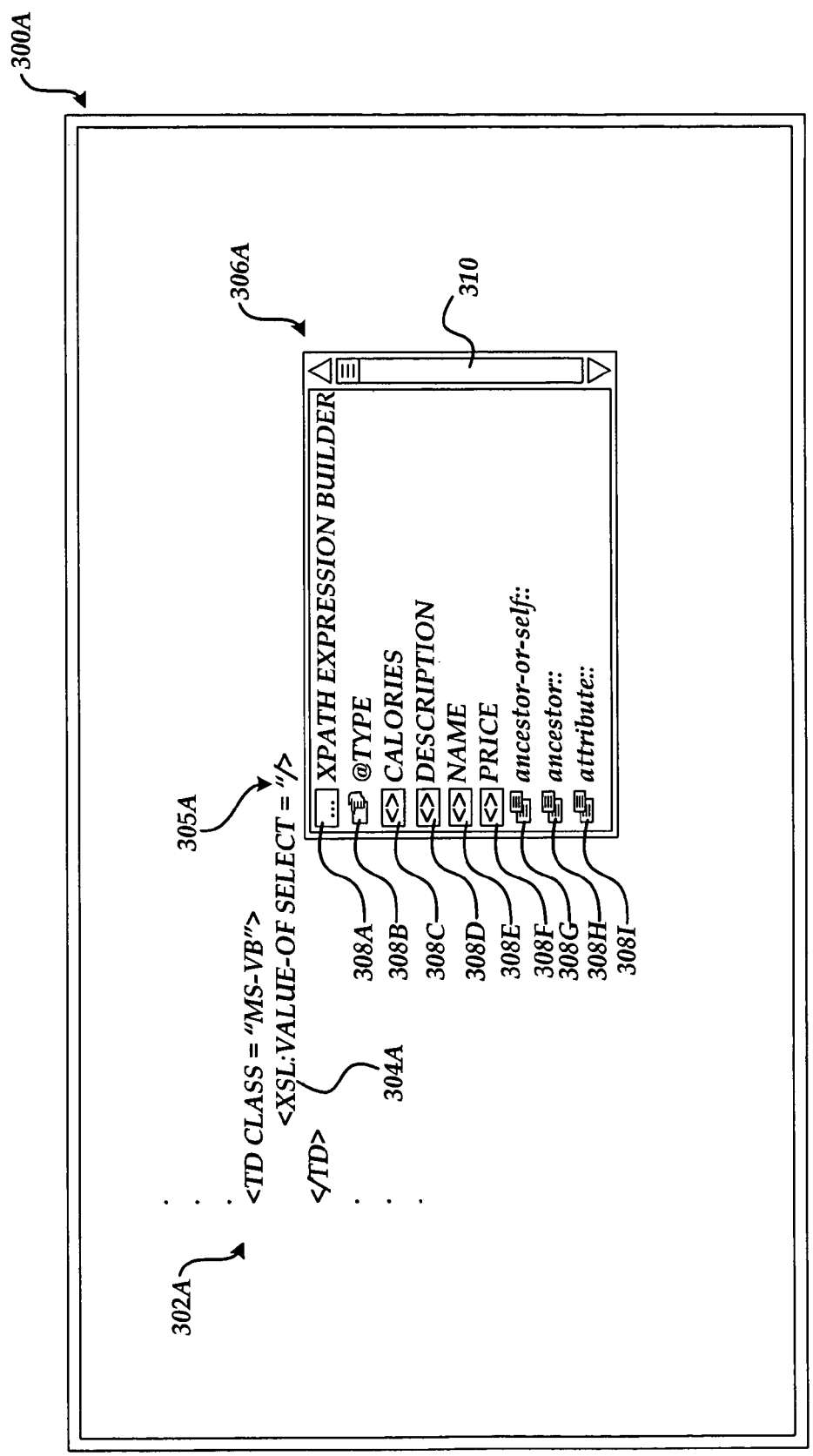
FIGS. 3A-3D are user interface diagrams showing several aspects of a user interface for providing assistance with the creation of an XPath expression presented herein.

FIG. 3A shows a screen display 300A provided by the editing application 102. The screen display 300A includes an area for editing XSLT. For instance, in the example shown in FIG. 3A, a user is creating or editing the XSLT 302A that includes an XSLT "<XSL:VALUE-OF>" tag 304A. The XSLT "<XSL:VALUE-OF>" tag 304A includes a "SELECT" attribute that is specified using an XPath expression. In this example, a user has started typing the XPath expression 305A by entering the opening quotation mark for the attribute.

In response to determining that the user is creating the XPath expression 305A, the editing application 102 is operative to display the user interface control 306A. In one implementation, the user interface control 306A is a drop-down menu, including a scroll bar 310 for scrolling the contents of the drop-down menu. It should be appreciated, however, that any suitable user interface control may be utilized to present the information described herein. In one embodiment, the user interface control 306A is displayed adjacent to the XPath expression 305A that is being created or edited.

The user interface control 306A includes a number of selectable items 308A-308I. As described herein, the items 308A-308I are generated dynamically as the user types the XPath expression 305A. Each time the user types a character into the XPath expression 305A, the items 308A-308I are reevaluated and the contents of the user interface control 306A are updated. In this manner, the user interface control 306A presents the user with the most appropriate selection of items 308A-308I for the typed portion of the XPath expression 305A. As also described herein, the items 308A-308I may be selected by a user. In response to such a selection, the XPath token or other parameter to which the selected item refers is inserted into the XPath expression 305A. Additional details regarding this process are provided below.

In one implementation, some of the items 308A-308I correspond to valid XPath tokens. For instance, in the example shown in FIG. 3A, the items 308B-308E correspond to XML elements in the XML input data source 106. The XML elements shown in the user interface control 306A are identified based upon the typed portion of the XPath expression 305A and upon a current context in the XML input data source 106. The current context is the current location within the XML input data source that the XPath expression 305A is evaluated against. When one of the items 308B-308E is selected, an appropriate reference to the corresponding XML element is placed in the XPath expression 305A. The valid XML elements displayed in the user interface control 306A are continually updated based upon the typed portion of the XPath expression 305A.

The selectable items in the user interface control 306A may also correspond to valid attributes within the XML input data source 106. For instance, in the example shown in FIG. 3A, the item 308A corresponds to a "TYPE" attribute within the XML input data source 106. Like the XML elements, the XML attributes are also identified based upon the typed portion of the XPath expression 305A and upon the current context in the XML input data source 106. When the item 308A is selected, an appropriate reference to the corresponding XML attributed is placed into the XPath expression 305A. The valid XML attributes displayed in the user interface control 306A are also continually updated based upon the typed portion of the XPath expression 305A.

In one embodiment, the selectable items in the user interface control 306A may also correspond to valid XPath axes. XPath axes specify a direction relative to the current context in the XML input data source. There are 13 axes defined in XPath: self; child; descendent; parent; ancestor; following-sibling; preceding-sibling; following; preceding; attribute; namespace; descendent-or-self; and ancestor-or-self. In the example shown in FIG. 3A, the items 308F-308I correspond to several of the valid XPath axes for the XPath expression 305A under construction.

The valid XPath axes shown in the user interface control 306A are identified based upon the typed portion of the XPath expression 305A and upon the current context in the XML input data source 106 and updated continually as the XPath expression 305A is being created. When one of the items 308F-308I is selected, a correct reference to the corresponding XPath axis is inserted into the XPath expression 305A. As also shown in FIG. 3A, the user interface control 306A may also include an item 308A which, when selected, will cause a separate user interface to be presented for constructing an XPath expression (not shown in the FIGURES). This user inter-face provides facilities for assisting in the construction of an XPath expression, including a live result set preview. The live result set preview shows a simple rendering of the XPath expression under construction at the current context of the XML input source document. The live result set preview is updated as the XPath expression is created and modified. This functionality allows a user to see the data that is being retrieved by the XPath expression before the XPath expression has been completed.

Figure 3B:
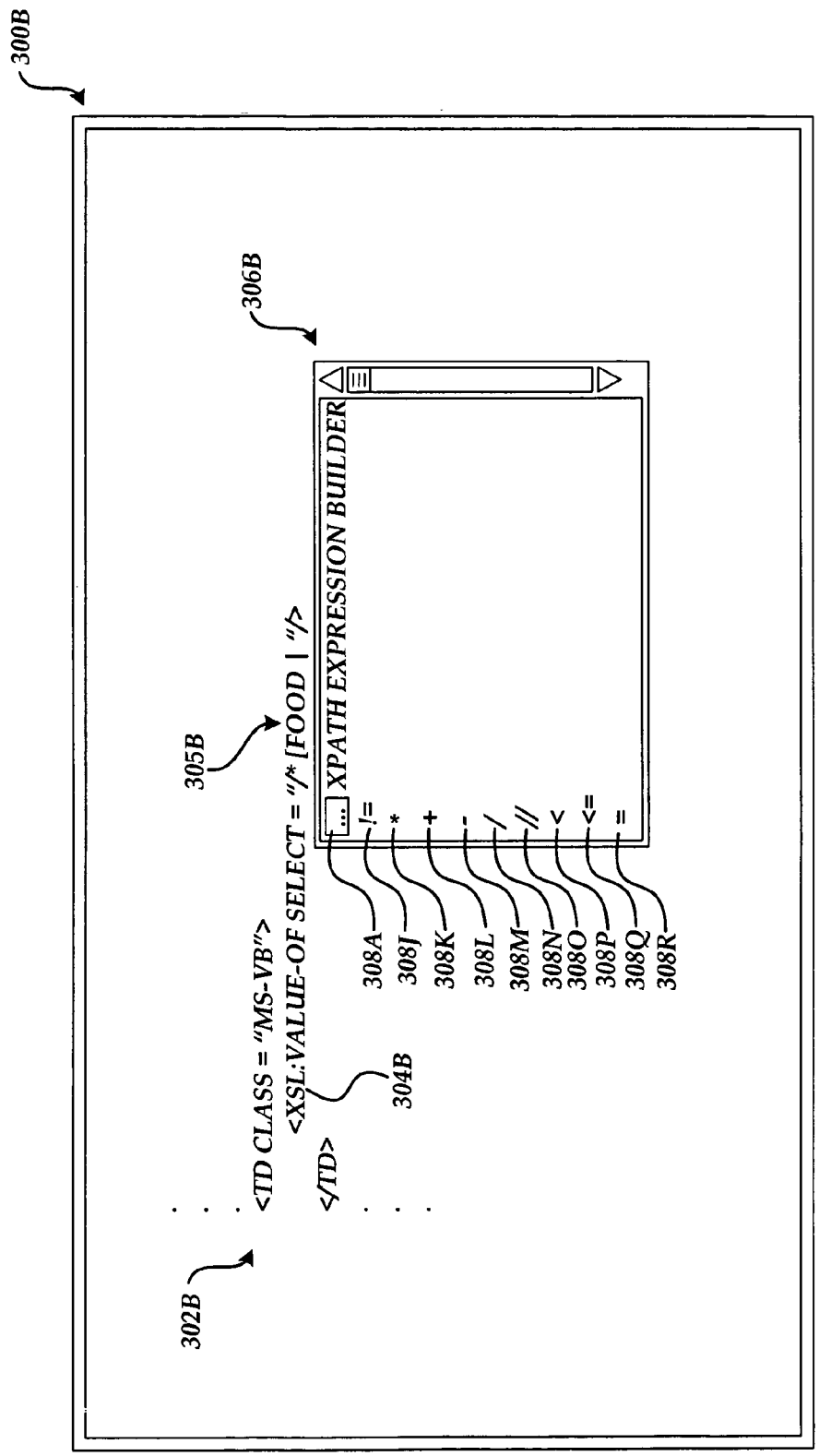

FIG. 3B shows an additional aspect of the user interface control 306 in one embodiment presented herein. In particular, the user interface control 306B shown in FIG. 3B includes the items 308J-308R, which are XPath operators. The operators include "!=", "*", "+", "−", "/", "//", "<", "<=" "=", and potentially others. The valid XPath operators shown in the user interface control 306B are identified based upon the typed portion of the XPath expression 305B and upon the current context in the XML input data source 106. The XPath operators are also updated continually in view of the portion of the XPath expression 305B that has been entered. When one of the items 308J-308R is selected, the corresponding XPath operator is inserted into the XPath expression 305B.

Figure 3C:
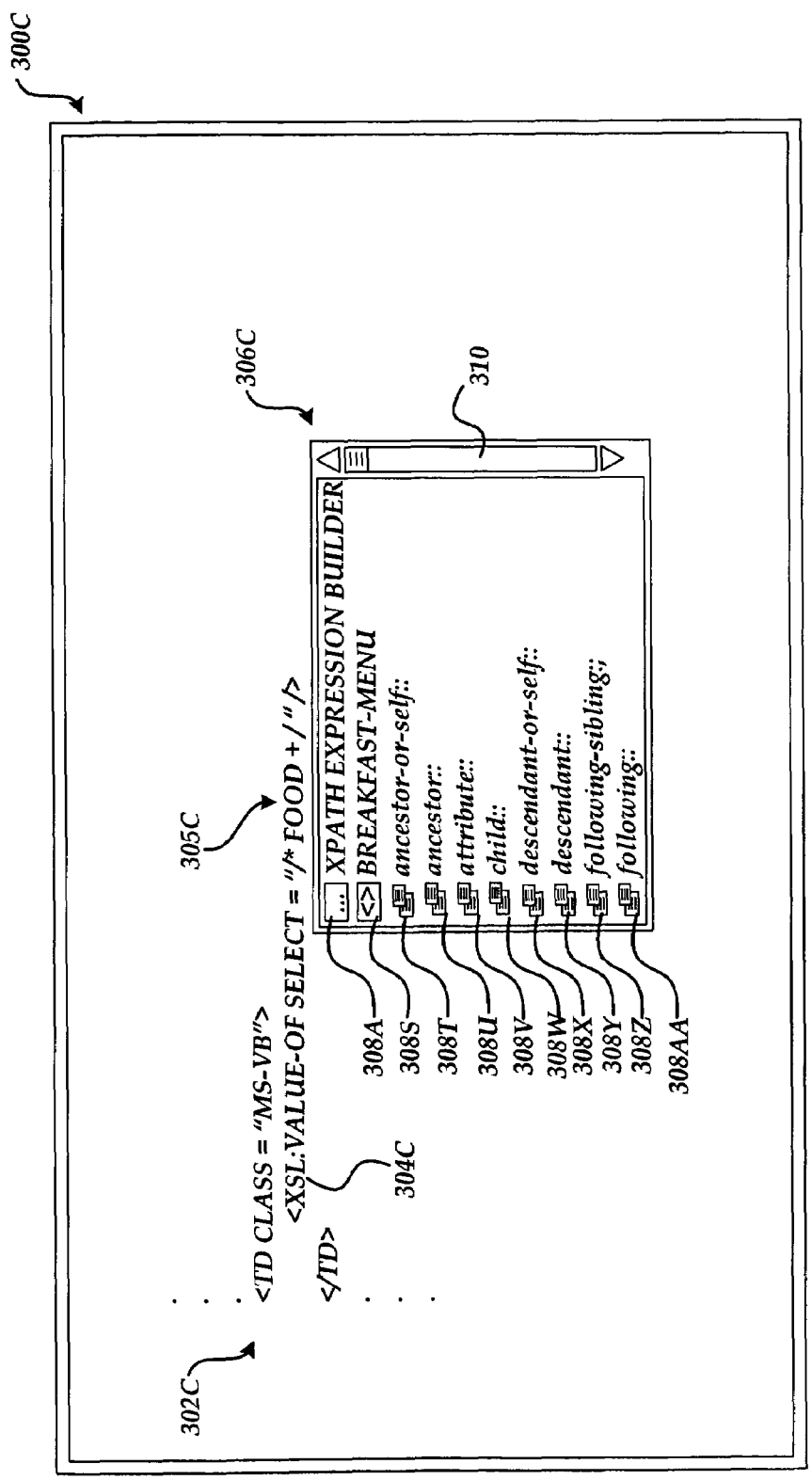

FIG. 3C illustrates another example of the dynamic nature of the user interface control 306C. In this example, the XPath expression 305C has been entered, resulting in the display of the user interface control 306C. The user interface control 306C includes a selectable item 308A for entering the XPath expression builder, the item 308B corresponding to the only valid XML element for the portion of the XPath expression 305C that has been typed, and the items 308T-308AA correspond to some of the valid XPath axes for the XPath expression 305C under construction. The remainder of the valid axes and other selections may be viewed by utilizing the scroll bar 310.

Figure 3D:
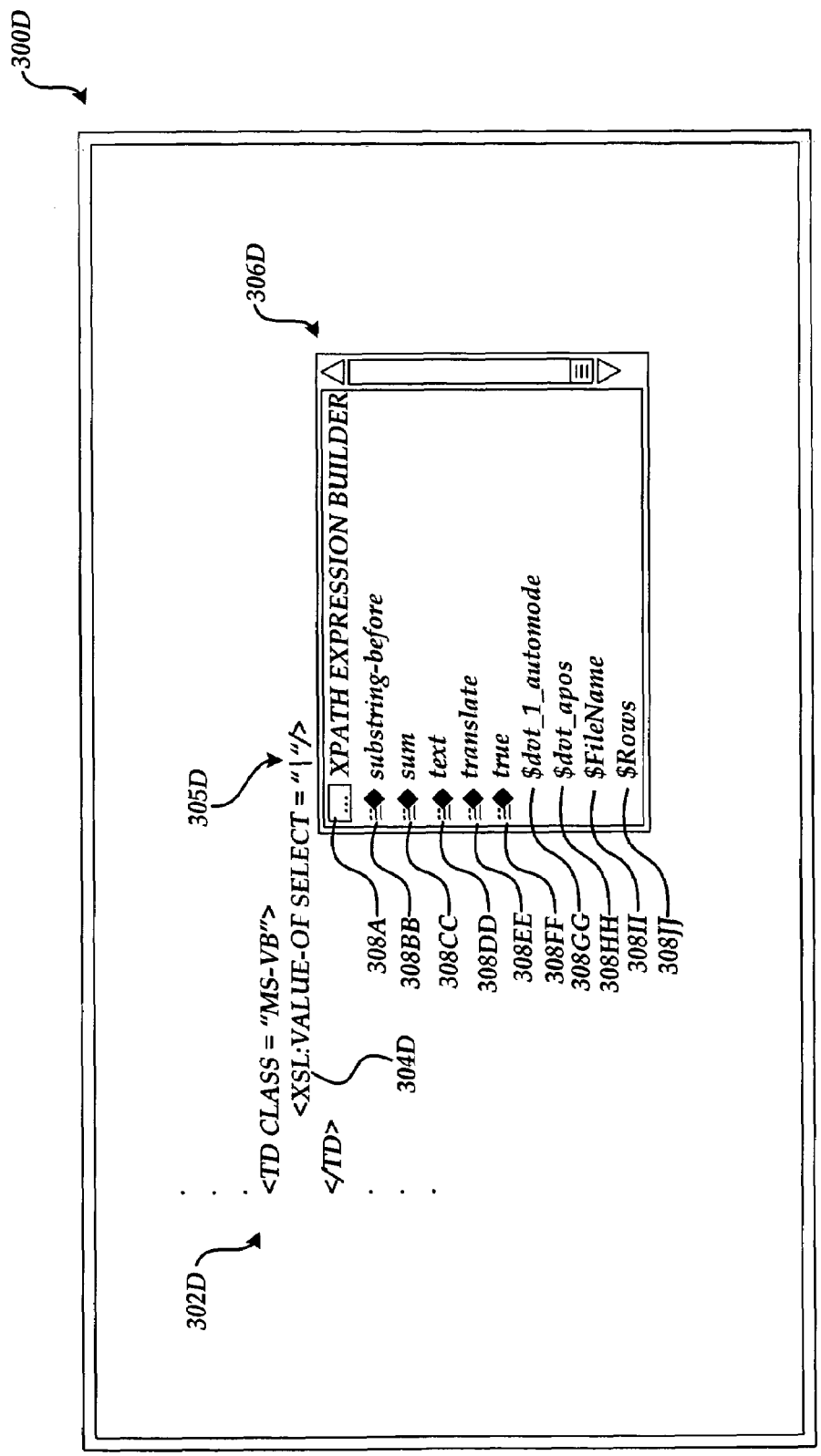

FIG. 3D shows several additional aspects of the user interface control 306 in one embodiment presented herein. In particular, the screen display 300D shown in FIG. 3D includes a user interface control 306D that includes the selectable items 308BB-308DD, which correspond to XSLT functions. When one of the items 308BB-308DD is selected, the corresponding XSLT function is inserted into the XPath expression 305D. The user interface control 306D also includes the items 308FF-308JJ. These items correspond to XSLT variables for the XSLT stylesheet file 104 being edited. Selection of one of the items 308FF-308JJ will cause a correct reference to the corresponding XSLT variable to be inserted into the XPath expression 305D being constructed. Additional details regarding the construction of the user interface control 306D will be provided below with reference to FIGS. 4A-4B.

Figure 4A:
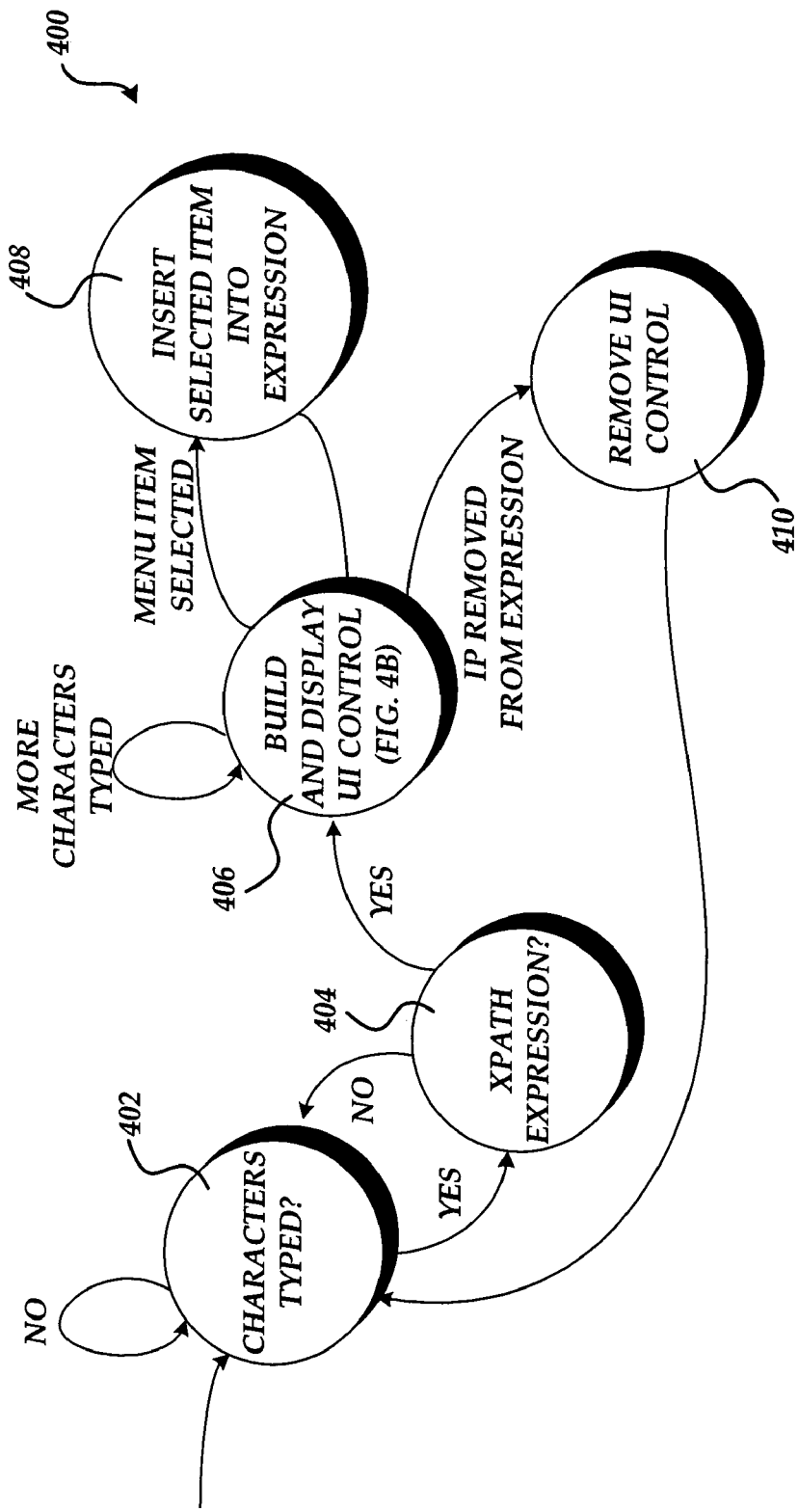
FIGS. 4A and 4B are state and flow diagrams, respectively, showing aspects of an illustrative routine for providing assistance with the creation of an XPath expression in one embodiment described herein.

Referring now to FIG. 4A, additional details will be presented regarding the embodiments presented herein for providing assistance with the creation of an XPath expression. In particular, FIG. 4A is a state diagram showing the routine 200, which illustrates processing operations performed by the editing application 102 in order to provide assistance to a user in the creation of an XPath expression in the form of the user interfaces described above with respect to FIGS. 3A-3D.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 400 begins at state 402, where the editing application 102 determines whether any characters have been typed by a user. If no characters have been typed, the routine 400 returns back to state 402. If characters have been typed, the routine 400 transitions to state 404. At state 404, a determination is made as to whether the typed characters indicate that the user is creating an XPath expression. If not, the routine 400 transitions back to state 402 for receiving additional characters. If an XPath expression is being created, the routine 400 transitions to state 406.

At state 406, the user interface control 306 is built and displayed based upon the entered XPath expression. Details regarding one illustrative method for generating the user interface control 306 are provided below with respect to FIG. 4B. If additional characters are typed, the routine 400 regenerates the menu in view of the newly typed characters at state 406.

If one of the items in the user interface control 306 is selected, the routine 400 transitions to state 408, where the XPath token, attribute, operator, axis, XSLT function, or XSLT variable corresponding to the selected item is inserted into the XPath expression being created. From state 408, the routine 400 returns to state 406, where the contents of the user interface control 306 are updated. If the user removes the insertion point from the XPath expression, thereby indicating that they have finished creating the XPath expression, the routine 400 transitions to state 410, where the user interface control 306 is removed. The routine 400 then transitions back to state 402, described above.

Figure 4B:
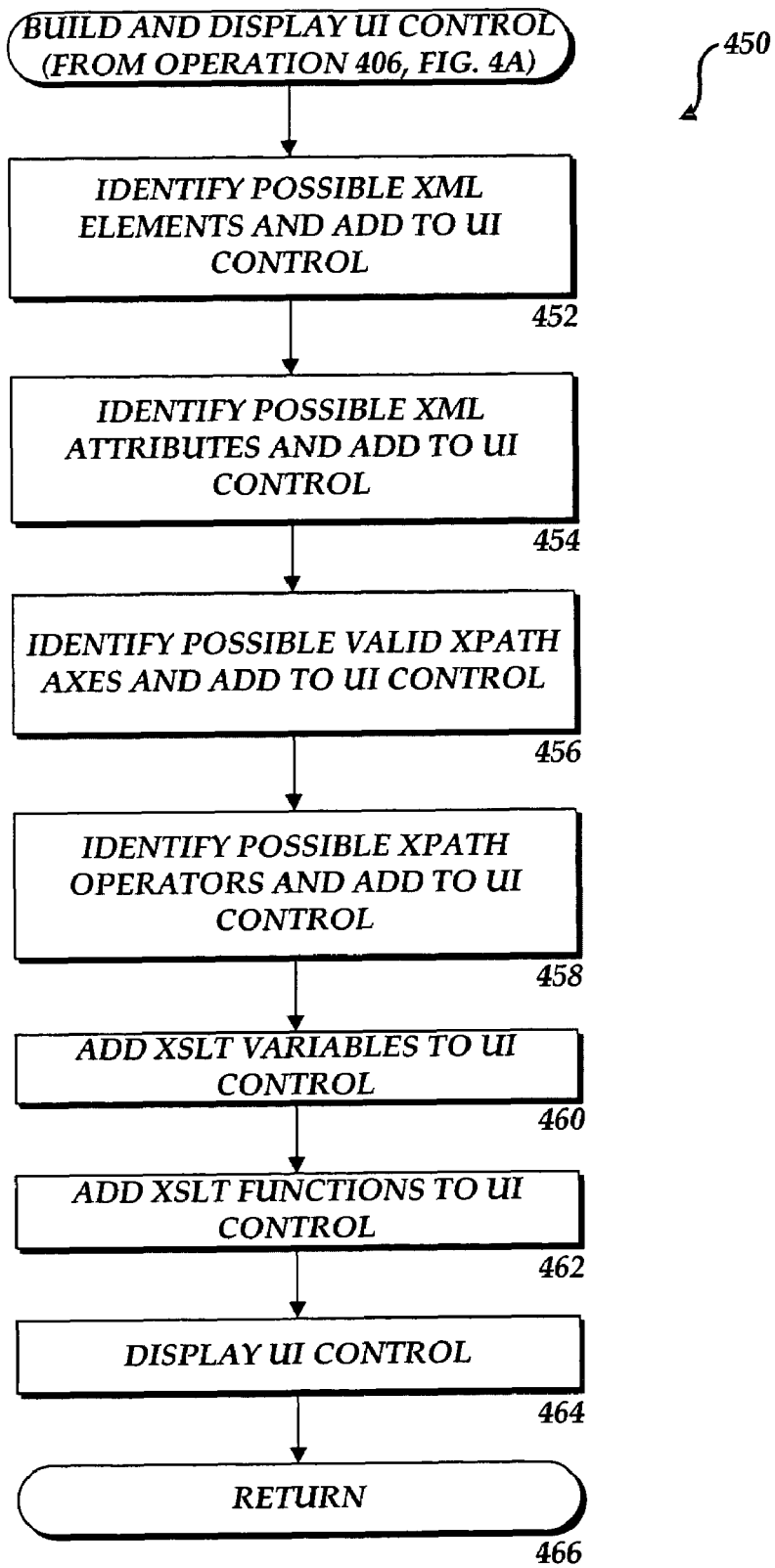

Turning now to FIG. 4B, an illustrative routine 450 will be described showing operations performed by the editing application 102 in order to create the user interface control 306 shown in FIGS. 3A-3D and described above. The routine 450 begins at operation 452, where the valid XML elements are identified based upon the XPath expression and the current context in the XML input data source 106. Once identified, the identified XML elements are added to the user interface control 306. From operation 452, the routine 450 continues to operation 454.

At operation 454, the valid XML attributes are identified based upon the XPath expression and the current context in the XML input data source 106. The identified XML attributes are added to the user interface control 306. From operation 454, the routine 450 continues to operation 456 where the valid XPath axes are identified based on the XPath expression and the current context in the XML input data source 106. The identified XPath axes are then added to the user interface control 306.

From operation 456, the routine 450 continues to operation 458, where the valid XPath operators are identified based upon the XPath expression and the current context in the XML input data source 106. The identified XPath operators are added to the user interface control 306. From operation 458, the routine 450 continues to operation 460, where the XSLT variables are added to the user interface control 306. At operation 462, the XSLT functions are added to the user interface control 306. Once each of these items has been added to the user interface control 306, the routine 450 continues to operation 464, where the user interface control 306 is displayed. The routine 450 then continues to operation 466, where it returns to state 406, described above with respect to FIG. 4A.

Figure 5:
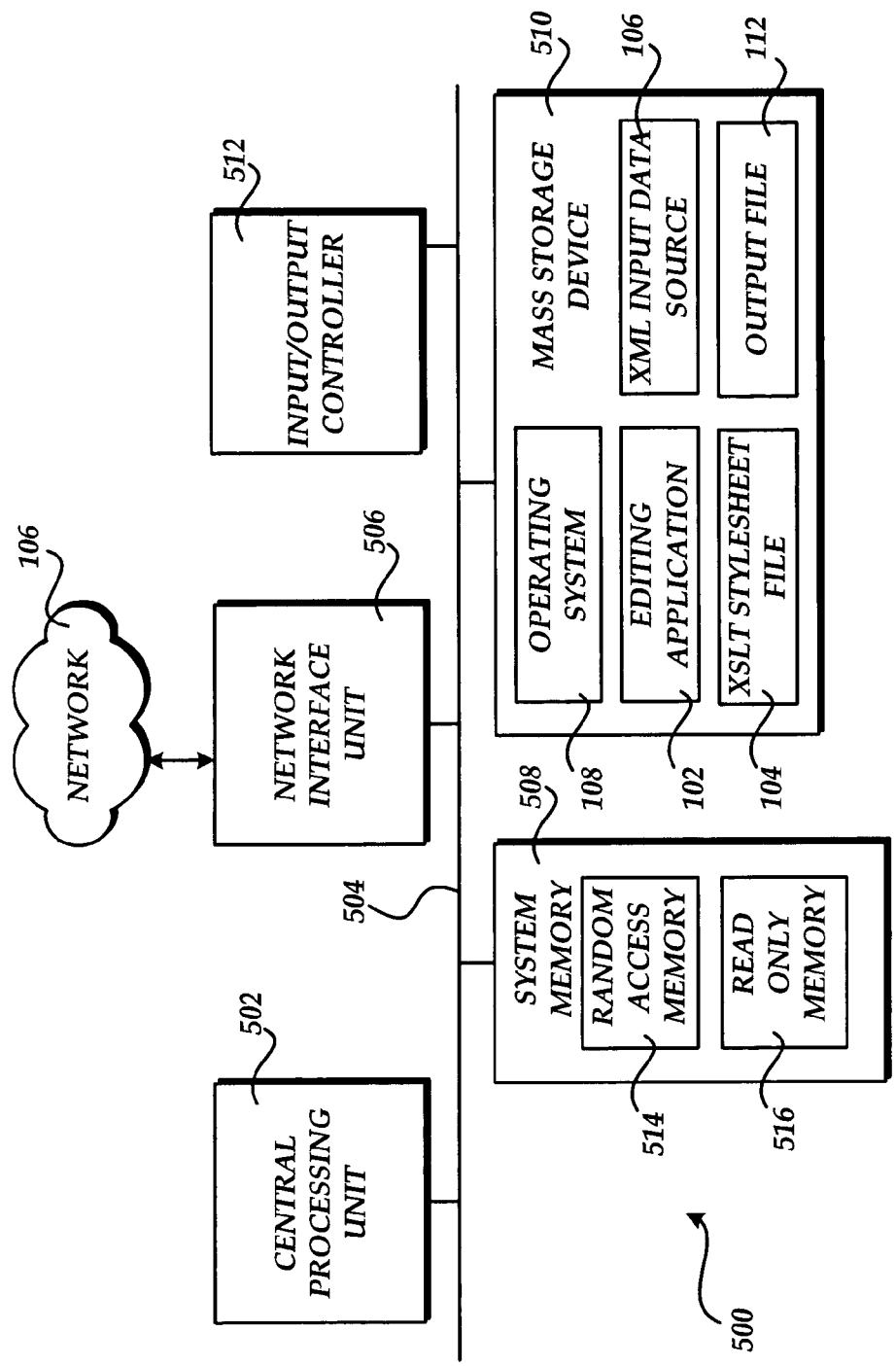
FIG. 5 is a computer architecture diagram showing a computer architecture suitable for implementing the various computer systems described herein.

Referring now to FIG. 5, an illustrative computer architecture for a computer 500 utilized in the various embodiments presented herein will be discussed. The computer architecture shown in FIG. 5 illustrates a conventional desktop, laptop computer, or server computer. The computer architecture shown in FIG. 5 includes a central processing unit 502 ("CPU"), a system memory 508, including a random access memory 514 ("RAM") and a read-only memory ("ROM") 516, and a system bus 504 that couples the memory to the CPU 502. A basic input/output system containing the basic routines that help to transfer information between elements within the computer 500, such as during startup, is stored in the ROM 516. The computer 500 further includes a mass storage device 510 for storing an operating system 108, application programs, and other program modules, which will be described in greater detail below.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available media that can be accessed by the computer 500.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 106, such as the Internet. The computer 500 may connect to the network 106 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 108 suitable for controlling the operation of a networked desktop or server computer, such as the WINDOWS XP operating system from MICROSOFT CORPORATION of Redmond, Wash., or the WINDOWS VISTA operating system, also from MICROSOFT CORPORATION. The mass storage device 510 and RAM 514 may also store one or more program modules and data files. In particular, the mass storage device 510 and the RAM 514 may store the editing application 102, the XSLT stylesheet file 104, the XML input data source 106, the output file 112, and any of the other program modules and data files described above. Other program modules may also be stored in the mass storage device 510 and utilized by the computer 500. It should be appreciated that some or all of these program modules and data files may be stored at and utilized by a remote server computer connected via a network.

Based on the foregoing, it should be appreciated that systems, methods, and computer-readable media for providing assistance with the creation of an XPath expression are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing assistance with the creation of an extensible markup language (XML) path language (XPath) expression, the method comprising:
    monitoring keystrokes entered by a user at a computer;
    determining from the keystrokes whether an XPath expression is being created by the user based on whether characters typed by the user comprise a typed portion of an XPath expression entered by the user;
    in response to determining that an XPath expression is being created, dynamically identifying one or more valid XPath tokens for completing the XPath expression being created based on the typed portion of the XPath expression entered by the user;
    displaying to the user the typed portion of the XPath expression entered by the user and a user interface control having selectable items corresponding to the identified XPath tokens for completing the XPath expression being created, wherein:
        the user interface control is displayed adjacent to the typed portion of the XPath expression entered by the user that is being displayed to the user, and
        the selectable items corresponding to the identified XPath tokens that are displayed in the user interface control do not include the typed portion of the XPath expression entered by the user;
    updating the identified XPath tokens being displayed for completing the XPath expression being created by the user as the user continues to type additional characters into the typed portion of the XPath expression;
    receiving a selection of one of the selectable items displayed in the user interface control; and
    inserting the identified XPath token corresponding to the selected item into the XPath expression being created by the user in response to receiving the selection.

2. The method of claim 1, wherein determining whether an XPath expression is being created comprises determining whether an element in an extensible stylesheet language transformations (XSLT) tag whose value is permitted to contain XPath is being created.

3. The method of claim 1, wherein determining whether an XPath expression is being created comprises determining whether an attribute value template (AVT) is being created.

4. The method of claim 1, wherein the XPath tokens comprise one or more XML elements in an XML input data source.

5. The method of claim 4, wherein the XML elements are selected based upon the XPath expression and a current context in the XML input data source.

6. The method of claim 1, wherein the XPath tokens comprise one or more XML attributes in an XML input data source.

7. The method of claim 6, wherein the XML attributes are selected based upon the XPath expression and a current context in the XML input data source.

8. The method of claim 1, wherein the XPath tokens comprise one or more XPath axes.

9. The method of claim 1, wherein the XPath tokens comprise one or more operators.

10. The method of claim 1, wherein displaying the identified XPath tokens comprises displaying the identified XPath tokens and one or more XSLT variables selected based upon a current context in an XSLT stylesheet containing the XPath expression.

11. The method of claim 1, wherein displaying the identified XPath tokens comprises displaying the identified XPath tokens and one or more XSLT functions.

12. A computer-readable storage medium having computer-executable instructions stored thereon which, when executed by a computer, cause the computer to:
- monitor keystrokes entered by a user at a computer;
- determine from the keystrokes whether an extensible markup language (XML) path language (XPath) expression is being created by the user based on whether characters typed by the user comprise a typed portion of an XPath expression entered by the user;
- in response to determining that an XPath expression is being created, display to the user the typed portion of the XPath expression entered by the user and a user interface control having one or more selectable items, wherein:
  - each selectable item displayed in the user interface control is generated dynamically based on the typed portion of the XPath expression entered by the user and corresponds to a valid XPath token for completing the XPath expression being created,
  - the user interface control is displayed adjacent to the typed portion of the XPath expression entered by the user that is being displayed to the user, and
  - the selectable items corresponding to valid XPath tokens that are displayed in the user interface control do not include the typed portion of the XPath expression entered by the user;
- as the user continues to type additional characters into the typed portion of the XPath expression, update the selectable items corresponding to the valid XPath tokens that are displayed in the user interface control for completing the XPath expression being created by the user;
- receive a selection of one of the selectable items displayed in the user interface control; and
- insert the valid XPath token corresponding to the selected item into the XPath expression being created in response to receiving the selection.

13. The computer-readable storage medium of claim 12, comprising further computer-executable instructions which, when executed by the computer, will cause the computer to:
- determine whether an element in an extensible stylesheet language transformations (XSLT) tag whose value is permitted to contain XPath is being created; and
- determine whether an attribute value template (AVT) is being created.

14. The computer-readable storage medium of claim 13, wherein:
- the user interface control comprises a drop-down menu, and
- the selectable items comprise menu items within the drop-down menu.

15. The computer-readable storage medium of claim 14, wherein the XPath tokens comprise one or more XML elements in an XML input data source, the XML elements being selected based upon the XPath expression and a current context in the XML input data source.

16. The computer-readable storage medium of claim 15, wherein the XPath tokens further comprise one or more XML attributes in the XML input data source, the XML attributes being selected based upon the XPath expression and the current context in the XML input data source.

17. The computer-readable storage medium of claim 16, wherein the XPath tokens comprise one or more XPath axes.

18. The computer-readable storage medium of claim 16, wherein the XPath tokens comprise one or more XPath operators.

19. The computer-readable storage medium of claim 18, comprising further computer-executable instructions which, when executed by the computer, will cause the computer to:
- display menu items in the drop-down menu corresponding to one or more XSLT variables; and
- display menu items in the drop-down menu corresponding to one or more XSLT functions.

20. A method for providing assistance during the creation of an extensible markup language (XML) path language (XPath) expression, the method comprising:
- monitoring keystrokes entered by a user at a computer;
- determining from the keystrokes whether an XPath expression is being created by the user based on whether characters typed by the user comprise a typed portion of an XPath expression entered by the user;
- determining whether an element in an extensible stylesheet language transformations (XSLT) tag whose value is permitted to contain XPath is being created or whether an attribute value template (AVT) is being created;
- in response to determining that an XPath expression is being created for an XSLT tag or an AVT, displaying the typed portion of the XPath expression entered by the user and a drop-down menu adjacent to the typed portion of the XPath expression entered by the user, the drop-down menu including selectable menu items for completing the XPath expression being created, wherein:
  - the selectable menu items are generated dynamically based on the typed portion of the XPath expression entered by the user and correspond valid XML elements in an XML input data source for the expression, valid XML attributes in the XML input data source for the expression, valid XPath axes for the expression, valid XPath operators for the expression, XSLT variables, and XSLT functions; and
  - the selectable menu items that are displayed in the drop-down menu do not include the typed portion of the XPath expression entered by the user;
- updating the selectable menu items for completing the XPath expression being created as the user continues to type additional characters into the typed portion of the XPath expression;
- receiving a selection of one of the selectable menu items displayed in the drop-down menu; and
- in response to receiving the selection, inserting the XML element, XML attribute, XPath axis, XPath operator, XSLT variable, or XSLT function to which the selected menu item corresponds into the XPath expression being created by the user.

* * * * *

UNITED STATES PATENT AND TRADEMARK OFFICE
CERTIFICATE OF CORRECTION

| | | |
|---|---|---|
| PATENT NO. | : 7,720,868 B2 | Page 1 of 1 |
| APPLICATION NO. | : 11/598455 | |
| DATED | : May 18, 2010 | |
| INVENTOR(S) | : Robert J. Mauceri, Jr. et al. | |

It is certified that error appears in the above-identified patent and that said Letters Patent is hereby corrected as shown below:

In column 12, line 36, in Claim 20, after "correspond" insert -- to --.

Signed and Sealed this
Twenty-fourth Day of May, 2011

David J. Kappos
*Director of the United States Patent and Trademark Office*